United States Patent [19]

Lazzari

[11] 4,258,400
[45] Mar. 24, 1981

[54] PLATFORM HAVING AT LEAST ONE TRANSDUCER FOR READING FROM AND/OR RECORDING ON A DATA CARRIER

[75] Inventor: Jean-Pierre Lazzari, Paris, France

[73] Assignee: Compagnie Internationale pour l'Informatique Cii/Honeywell Bull (Societe Anonyme), Paris, France

[21] Appl. No.: 34,747

[22] Filed: Apr. 30, 1979

[30] Foreign Application Priority Data

Jun. 21, 1978 [FR] France .................. 78 18576

[51] Int. Cl.³ .................. G11B 5/60; G11B 17/32
[52] U.S. Cl. .................................. 360/103
[58] Field of Search ................. 360/103, 104

[56] References Cited

U.S. PATENT DOCUMENTS 3,990,106  11/1976  Kameyama et al. .......... 360/103

Primary Examiner—Robert S. Tupper
Attorney, Agent, or Firm—Edward J. Kondracki

[57] ABSTRACT

A platform for supporting at least one magnetic transducer for reading from and/or recording on a data carrier. The platform is supported from a carrier arm adapted to position the platform over the data carrier which may be a multi-track disc. The magnetic transducer is supported in the lower face of the main body of the platform. The lower face includes a plurality of skids and one or more grooves which receive a rigid strut for suspending the platform over the carrier. The strut is secured in the groove(s) with the plane of the strut passing through the center of gravity of the platform. The strut may be secured to a frame surrounding the platform which in turn may be secured to a further concentric frame also surrounding the platform. The strut includes a constriction located at the virtual axis of rotation or axis of oscillation of the platform and at which point the cross-sectional area of the strut is at a minimum. The axis of symmetry of the constriction lies in a direction perpendicular to the major dimension of the strut and coincides with the virtual axis of rotation or axis of oscillation such that the sum of the bending moment of the constriction and the moment of the pressure forces exerted on the lower face of the main body is zero.

11 Claims, 11 Drawing Figures

PLATFORM HAVING AT LEAST ONE TRANSDUCER FOR READING FROM AND/OR RECORDING ON A DATA CARRIER

BACKGROUND OF THE INVENTION

Cross Reference to Related Applications

The present invention relates to transducer carriers or platforms of the type which are the subject matter of commonly-assigned copending application Ser. No. 037,725, filed May 10, 1979 (Docket Cii/HB 2177) by Jacques Desserre, the subject matter of which is hereby incorporated by reference.

FIELD OF THE INVENTION

The present invention relates to a platform for at least one transducer for reading from and/or recording on a data carrier. It is particularly applicable to magnetic reading and/or recording transducers for magnetic peripherals of data processing systems, in particular disc memories.

DESCRIPTION OF THE PRIOR ART

The use of magnetic disc memories in data processing systems is becoming increasingly popular by reason of their storage capacity and the relatively short time required by their reading and/or recording transducers (also called read and/or write transducers) to access data contained anywhere on the discs from the moment when an access order is received from the processing system.

Magnetic discs carry data on concentric, circular recording tracks whose radial width does not exceed a few hundreths of a millimeter and which generally cover the major proportion of both faces of the discs. In operation, the discs, which are parallel, co-axial, and generally of the same diameter, are driven in rotation at a constant speed by an electric motor. Current practice is generally to associate one or more transducers with each face of the disc, the number of transducers being very much smaller than the number of tracks. (If the number of tracks is several hundred, the number of transducers does not exceed approximately ten or twenty and is often no more than one). When it is desired to achieve a substantial reduction in the time taken by each of the transducers to access any item of data contained on the said face, a plurality of transducers is used rather than just one.

Transducers have electrical input and/or input leads connected to the electronic read and/or write circuits of the disc memory with which the transducers are associated. When data recorded on a face of a magnetic disc passes in front of the transducer or transducers associated with this face, the transducer or transducers emit electrical signals along the electrical leads, which signals are transmitted to the electronic read and/or write circuits. Conversely, if the electronic circuits feed electrical signals to the transducer or transducers via the electrical leads, data will be recorded on the face of the associated magnetic disc.

The transducers are usually magnetic transducers and have a magnetic circuit provided with an air gap, around which a winding is arranged, the latter having electrical input and/or output leads. The air gap of each transducer is arranged opposite that face of the disc with which the transducer is associated, at a distance of a few microns or even a few tenths of a micron and enables data to be read and/or recorded. It can thus be said that the air gap constitutes the means by which the transducer picks up and/or records the data contained on the face of the disc.

Current practice is for the transducers associated with one and the same face of a disc to be arranged on a single platform, which has to be moved radially above the said face to enable the transducers to access any data contained on the said face. Such platforms are called "moving platforms".

Another known form of platforms is the so-called "fixed" platforms which, during reading and/or recording operations, remain stationary at all times above clearly defined tracks on the face of the disc with which they associate. In this arrangement, each of the transducers contained within a platform remains associated with one and the same track in the course of time.

Whether a platform is fixed or moving, a platform incorporating at least one transducer and associated with one face of a disc is secured to a rigid movable arm. In the case of the moving platform the arm is mounted on a carriage which moves externally of the discs, whereas in the case of a fixed platform it is mounted directly on the framework of the disc memory to which the disc belongs.

Whatever the type (fixed or moving), platforms incorporating one or more transducers are made up of two principal parts, namely, on the one hand, a part called the "main body" of the platform which incorporates the transducers and, on the other hand, a suspension device of which one end is secured to the main body and the other end is secured to the rigid detachable arm. Generally, but not exclusively, the main body of a platform is in the shape of a relatively shallow right-angled parallelepiped of which one major face, termed the "lower" face, contains the means which the transducers have for picking up and/or recording data. The major face termed the "upper" face contains the ends of the electrical input and/or output leads of the transducer or transducers and the means which enable these leads to be connected to the electrical read and/or write circuits of the disc memory.

Presently, increasingly frequent use is being made of the platforms known to those skilled in the art as "Winchester" platforms. Such platforms are manufactured inter alia by Applied Magnetic Corporation (A.M.C.) under the type numbers 3304 and 3306.

A platform of the "Winchester" is produced as follows:

In the lower face of its main body are formed one or more gulleys, also termed "grooves" or "channels", whose depth is greater than or equal to 30 microns and may be as much as a few tenths of a millimeter. As a result, there are on the said lower face a plurality of projecting portions which are termed skids and which are, broadly speaking, ski-shaped.

The rotation of the discs causes a cushion of compressed air to be formed between the lower face of the main body of the platform and the face of the disc associated with the platform. This cushion of air prevents the main body from touching the disc which might damage it. It is, therefore, said that the main body and, by extension, the platform, flies above the face of the disc which is associated with it.

The cushion of air so developed exerts a pressure against the surface of the skids in a direction normal thereto. This pressure is directed from the lower face towards the upper face of the main body of the platform. Dynamic equilibrium for the platform when in flight is achieved by setting up, in opposition to the force $F_p$ generated by the pressure of the cushion of air against the surface of the skids, a loading force $F_c$ which is directed in the opposite direction. The so-called loading force is applied to the upper face of the main body by means of a pivot and has a modulus equal to that of the pressure force. The pressure force is proportional to the area of the flight surface. Thus, it should be apparent that by reducing the area of the flight surface the grooves formed in the lower face of the main body enable the pressure force, and thus the loading force, to be reduced.

The loading force is, for example, generated by a pre-stressed spring secured to the rigid arm carrying the platform. It is relatively small and of the order of 10 to 20 grams. Because of this, a platform of the "Winchester" type is known as a lightly loaded platform.

Generally, a platform of the "Winchester" type flies above the face of the disc with which it is associated in such a way that the surface of the skids is slightly inclined to the face of the disc. This allows the skids on the platform to produce sufficient lift to enable the platform to fly stably above the face of the disc. The total surface area of the skids is defined as being the flight surface of the platform. The front of the flight surface is defined as being that part of the surface which is the first in time to have pass before it the face of the disc with which it is associated. Similarly, the rear of the flight surface is defined as being that part of the surface which is the last in time to have this same face pass before it.

In cases where the transducer or transducers of the platform are magnetic, its or their air gaps is or are, as the case may be, arranged in the skids at the rear of the flight surface. The main body of the platform is inclined to the surface of the disc in such a way that the rear of the platform lies at a distance from the surface of the disc, termed the "altitude of flight". This "altitude of flight" is of the order of a few tenths of a micron. This distance is less than the distance which separates the same face from the front of the flight surface, which is of the order of a few microns.

Because of the fact that "Winchester" platforms are lightly loaded, this enables low altitudes of flight to be achieved. Such platforms have distinct advantages. For example, by reason of their low altitude of flight, read signals from the transducer or transducers may be obtained whose amplitude is relatively high. This provides reliable reading. Also, because of their light loading, the main body of the platform is prevented from striking against the disc and thus damaging both the disc and the main body.

However, despite the aforenoted advantages, by reason of their light loading, the flight of the platforms may be relatively unstable. To this end, a platform of the "Winchester" type is subject to an oscillatory movement about a central position which causes it to approach and recede from the disc. The platform will thus oscillate about an axis which is parallel to the surface of the disc and which is situated outside and to the rear of the main body of the platform. This axis of rotation is called the "virtual axis of rotation" of the platform.

The principal causes of the oscillatory movement are as follows:

It is known that the surface of the disc is not absolutely flat. On a microscopic scale, it can in fact be seen to contain a plurality of dips and elevations. This being the case, when the platform is situated above an elevation on a disc, the thickness of the cushion of air is reduced. As a result the pressure force $F_p$ increases and this in turn results in an increase in the loading force $F_c$ because the spring which applies the pressure force $F_c$ is stressed to a greater degree. As a result, the platform moves closer to the disc. In the opposite case, where the platform is situated above a dip on the disc, the thickness of the cushion of air increases and the pressure force $F_c$ decreases. This entails a similar decrease in the loading force $F_c$ because the spring is stressed to a lesser extent. As a result the platform rears up and moves away from the disc.

It can be shown that during its oscillatory movement about the virtual axis of rotation otherwise known as the axis of oscillation the platform may be affected by external upsetting forces caused, for example, by the presence of dust between the flight surface of the platform and the face of the disc or by a collision between the platform and the said face, which collision normally takes place at the point where the air gaps are situated. Under these conditions a mechanical force $F_M$ is set up which causes the platform to rock about the pivot by means of which the loading force $F_c$ is applied.

Under these conditions there is a probability that the platform will touch the disc. If there is a comparatively large number of collisions between the platform and the face of the disc with which it is associated when the platform is flying above this face of the disc, the platform will deteriorate fairly rapidly as also will the face of the disc.

SUMMARY OF THE INVENTION

The present invention enables these disadvantages to be overcome by making provision for the sum of the moments of all the forces applied to the platform about its virtual axis of rotation or axis of oscillation to be zero, which ensures that it is in dynamic equilibrium in flight. Because of this, the invention enables the pivot to be dispensed with and, in addition, on the one hand, enables the stability of the platform in flight to be increased and on the other hand enables the risk of collision between the platform and the disc to be substantially reduced.

The platform, according to the invention, incorporates at least one transducer for reading from and/or recording on a data carrier and comprises a main body containing the transducer. A suspension device is connected on the one hand to the main body and on the other hand to an arm carrying the platform. The lower face of the main body contains the means which the transducer has for picking up and/or recording data, which means are arranged facing the carrier. The arrangement is such that the sum of the moments of the forces applied to the platform about its virtual axis of rotation is zero.

BRIEF DESCRIPTION OF THE DRAWINGS

Other features and advantages of the invention will become apparent from the following description, which is given by way of non-limiting example, and with reference to the accompanying drawings:

In the drawing:

FIG. 1 shows a prior art platform having at least one transducer, the platform being shown in flight about a magnetic disc, and illustrated in three separate views;

FIGS. 4, 5 and 6 show preferred embodiments of a platform according to the invention;

DESCRIPTION OF THE PREFERRED EMBODIMENTS

Figure 1A:
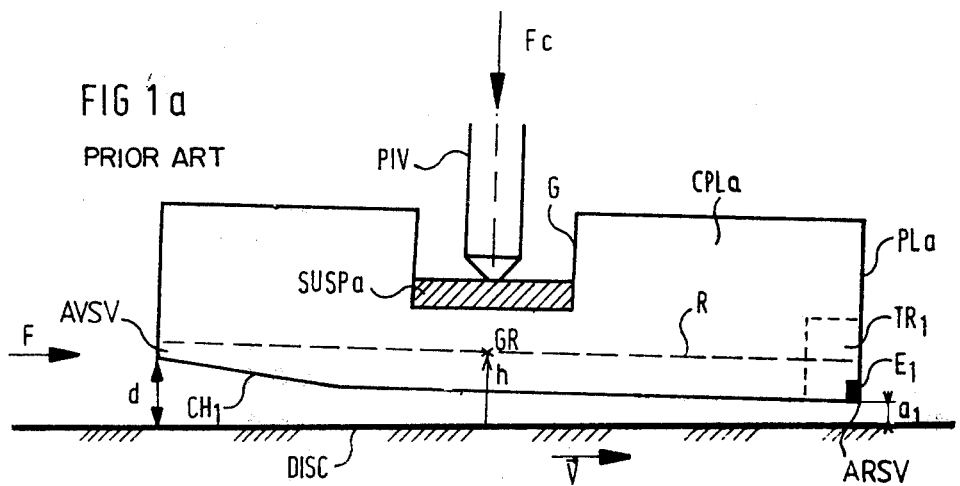
FIG. 1a is a side view.
Figure 1B:
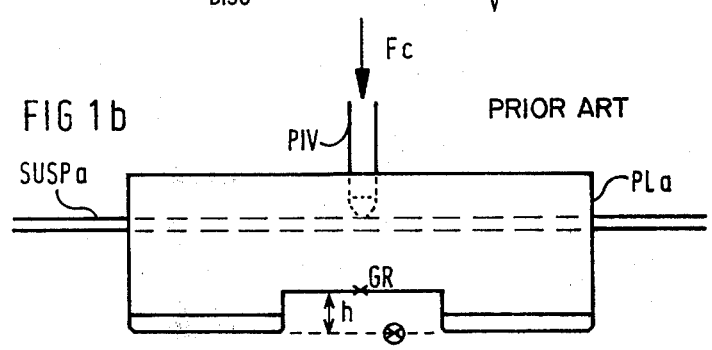
FIG. 1b is an end-on view.
Figure 1C:
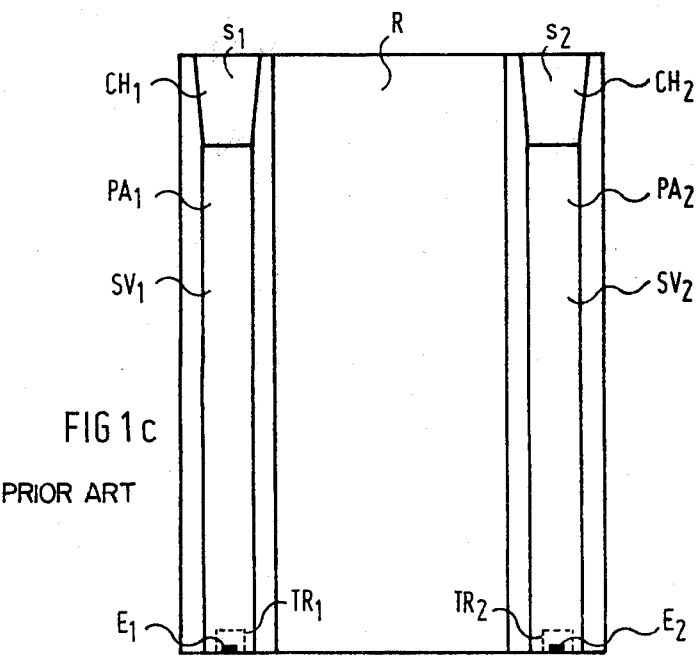
FIG. 1c is a view from below (seen from that face of the magnetic disc with which the said platform is associated).

In order to better understand the principles of operation and construction of a platform constructed according to the invention and having at least one transducer, a few facts relating to the principles of construction and operation of prior art platforms will be reviewed with reference to FIGS. 1 and 2.

FIG. 1 illustrates a prior art platform $Pl_a$. This platform comprises, on the one hand, a main body $CPL_a$ of substantially parallelepiped shape which is shown in the form of a catamaran having two skids $PA_1$ and $PA_2$ between which is situated a groove R and on the other hand, a suspension device $SUSP_a$.

Each of the two skids $PA_1$ and $PA_2$ contains a transducer. The skid $PA_1$ contains transducer $TR_1$ and the skid $PA_2$ contains transducer $TR_2$. Transducer $TR_1$ has an air gap $E_1$ for reading and/or recording and transducer $TR_2$ has an air gap $E_2$ for reading and/or recording. The two skids $PA_1$ and $PA_2$ have, respectively, in the one case a main flight surface $SV_1$ and a bevel $CH_1$ and in the other case a main flight surface $SV_2$ amd a bevel $CH_2$. If $s_1$ and $s_2$ are the surfaces of bevels $CH_1$ and $CH_2$, respectively, the total flight surface of skid $PA_1$ is equal to $SV_1+s_1$ and the total flight surface of skid $PA_2$ is equal to $SV_2+s_2$. The flight surface of the platform is thus equal to $SV_1+s_1+SV_2+s_2=SV$.

As can be seen in FIG. 1a, which shows the platform $PL_a$ in flight above a magnetic record carrier such as a magnetic disc DISC which is moving at a constant speed V in the direction of an arrow E, the platform is slightly inclined to the surface of the disc so that the air gaps $E_1$ and $E_2$ of transducers $TR_1$ and $TR_2$ are situated at an altitude of flight $a_1$ above the disc which is less than the altitude of flight $a_2$ of bevels $CH_1$ and $CH_2$, as most clearly shown in FIG. 1a. The flight surface SV forms an angle $\alpha$ with the surface of the disc. This angle is very small, being of the order of a few milliradians. It can also be seen that bevel $CH_1$ is situated at the front of the flight surface of the main body $PL_a$, which will be designated AVSV. Similarly, it can be seen that the air gaps $E_1$ and $E_2$ are situated at the rear of the flight surface, which will be designated ARSV.

It is assumed in this description that the platform is of the "moving" type.

One of the ends (which is not shown) of the suspension device $SUSP_a$ is fixed by any suitable means to a rigid movable arm (also not shown) which carries the platform $PL_3$, and which is secured to a carriage (also not shown) situated clear of the disc which enables the platform to be moved radially above the circular recording tracks on the magnetic disc DISC.

In FIG. 1a and 1b the suspension $SUSP_a$ of the platform is shown fixed to the floor of a gulley or channel G formed in the upper face of the body $CPL_a$ but it is clear that the suspension device $SUSP_a$ could equally well be fixed to the lower face of the main body, preferably in the groove R as is described in a French Pat. application No. 78.15765, entitled "Platform Incorporating At Least One Transducer For Reading And/Or Recording On A Data Carrier", which was filed in France on May 26, 1978, and which corresponds to U.S. application Ser. No. 037,725, assigned to the assignee of the present invention.

It is current practice for the loading force $F_c$ which, when the platform is in flight, to balance the force $F_p$ exerted by the cushion of air against the flight surface SV, which latter force is proportional to the area of the said surface. The loading force provided by a spring s is applied by means of a pivot PIV secured to the upper face of the main body of the platform.

As described above, when the platform $PL_1$ flies above the disc DISC, the platform $PL_a$ is subject to an oscillatory movement about a virtual axis of rotation or axis of oscillation AXV which is parallel to the surface of the disc and situated to the rear of the platform, that is to say, on the same side as the rear ARSV of the flight surface. This is best illustrated in FIG. 2a. In the same figure, it can be seen that while in flight the platform oscillates about a central position $POS_m$, between an upper position POS SUP and a lower position POS INF. When the platform is in position POS SUP, its altitude of flight is equal to $a_{sup}$ whereas when it is in the lower positions its altitude of flight is equal to $a_{inf}$ and thus $a_{sup} > a_{inf}$.

Figure 2B:
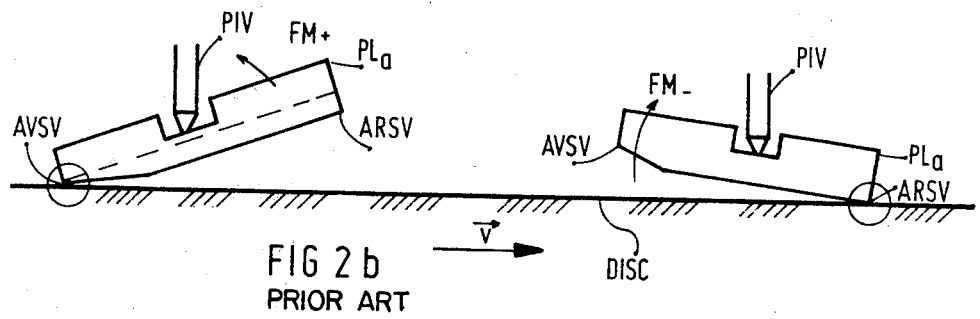
FIGS. 2a and 2b diagrammatically illustrate the oscillatory movement of a prior art platform about its virtual axis of rotation, and the disadvantages which result from this oscillatory movement as far as the flight of the platform is concerned.
Figure 2A:
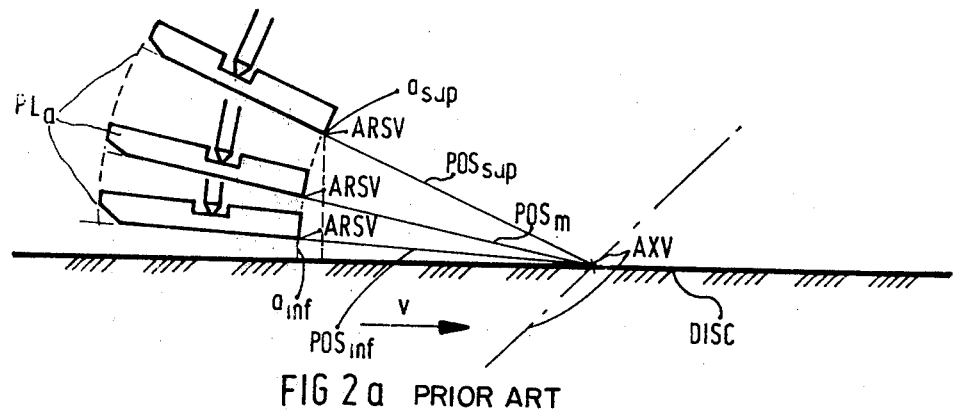

As can be seen in FIG. 2b, the platform, under the prompting of external forces caused, for example by impact between the platform and the disc or by the presence of dust between the flight surface of the platform and the disc itself, may rock about the pivot PIV under the prompting of a mechanical force $F_{M+}$ which forces the platform forwards, or a mechanical force $F_{M-}$ which forces the platform backwards. The forces $F_{M+}$ and $F_{M-}$ may be due to the said impact or the said dust. This may give rise to relatively violent collisions between the front AVSV or the rear AVSV of the flight surface of the platform and the face of the disc DISC. Such impacts result, on the one hand, in damage to the platform itself and, on the other hand, in damage to the face of the disc.

Figure 3:
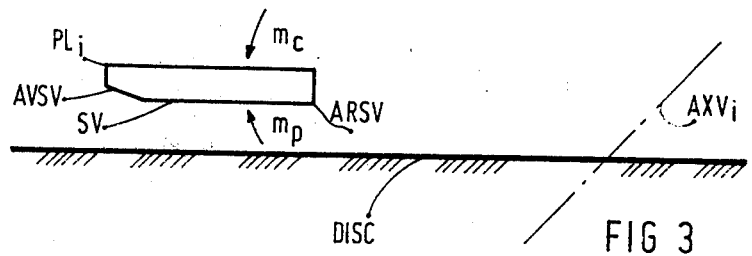
FIG. 3 is a diagram illustrating the principle of a platform according to the invention.

In accordance with the invention, means are provided to apply a combination of forces to the platform $PL_i$ such that the sum of the moments of all these forces about the virtual axis of rotation or axis of oscillation $AXV_i$ of the platform is zero and the platform is stable as shown in FIG. 3. Thus, if the moment of the pressure force $F_p$ about the axis $AXV_i$ is called $M_p$, and if the sum $\Sigma M_{ci}$ of the moments which balance the moment $M_p$ is called the loading moment $M_c$, then the invention is satisfied by the equation:

$$(M_p + M_c)_{AXV_i} = 0 \qquad (1)$$

Figure 4A:
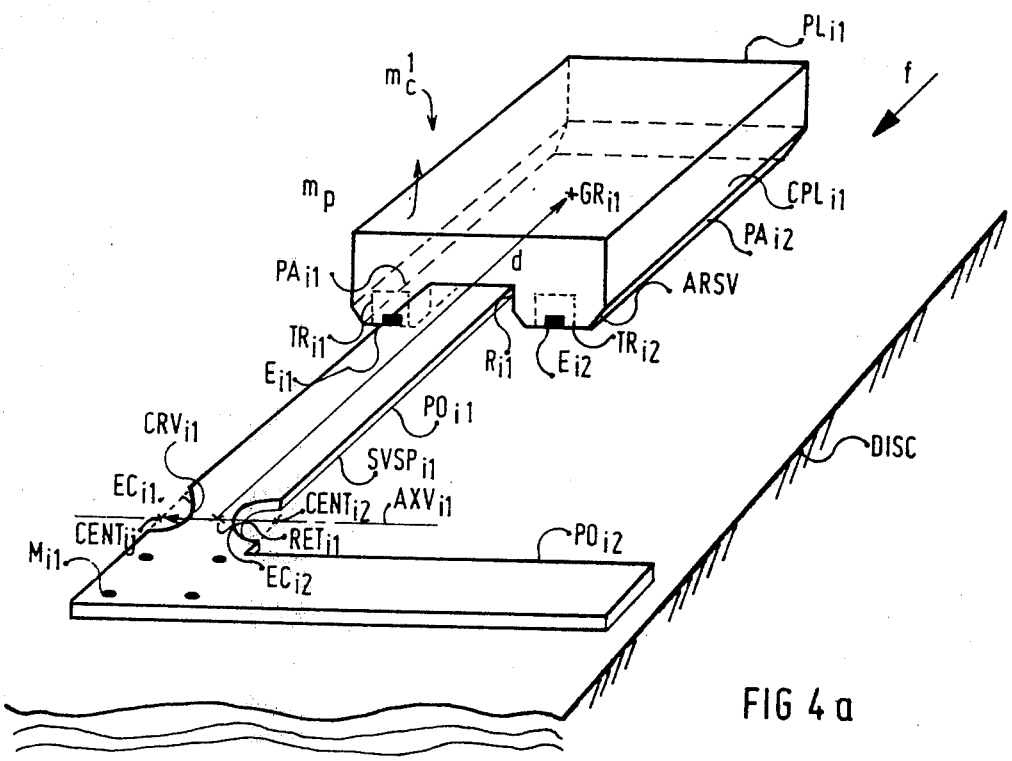
FIGS. 4a and 5a are three-quarter perspective views showing the platform in flight above the disc.

FIG. 4 shows a platform $PL_{i1}$ according to the invention whose main body $CPL_{i1}$, which is of the cataraman type, has two skids $PA_{i1}$ and $PA_{i2}$ between which is formed a groove $R_{i1}$. Skid $PA_{i1}$ contains a transducer $TR_{i1}$ and skid $PA_{i2}$ contains a transducer $TR_{i2}$. Transducers $TR_{i1}$ and $TR_{i2}$ have air gaps $E_{i1}$ and $E_{i2}$, respectively, which are situated at the rear ARSV of the flight surface of the main body $CPL_{i1}$.

The device $SUSP_{i1}$ for suspending the platform is preferably attached to the lower face of the main body $CPL_{i1}$ in the groover $R_{i1}$ (as described in the above-mentioned patent application). $SUSP_{i1}$ comprises a first rigid strut $PO_{i1}$ containing a constriction $RET_{i1}$ formed by means of two circular indentations $EC_{i1}$ and $EC_{i2}$ whose centers $CENT_{i1}$ and $CENT_{i2}$ allow the virtual axis of rotation or axis of oscillation AXV, best shown in FIG. 4b, of the platform $PL_{i1}$ according to the invention to be defined. It can be seen that this axis coincides with the axis of symmetry of the constriction in the direction normal to the major dimension of the strut $PO_{i1}$ (its length).

In other words, it can be seen that the constriction $RET_{i1}$ enables the virtual axis of rotation $AXV_{i1}$ of the platform to be given a physical form.

The first rigid strut $PO_{i1}$ of the suspension device $SUSP_{i1}$ is attached by attachment means $M_{i1}$ to a second rigid strut $PO_{i2}$ which in turn is attached to the arm (not shown) carrying the platform. When the platform $PL_{i1}$ is flying above the disc, the rigid strut $PO_{i1}$ will only flex at the point where its cross-section is at its smallest, that is to say, at the point where the constriction $RET_{i1}$ is situated (where the strut is most flexible). When the platform $PL_{i1}$ is in flight, it is assumed that the upstream strut $PO_{i2}$ remains fixed and behaves as a solid support.

The bending moment of strut $PO_{i1}$ (about axis $AXV_{i1}$) due to the resilience of the constrictions $RET_{i1}$, tends to depress the platform towards the disc and to balance the effect of the pressure force $F_p$. This moment is a function of the cross-section of the constriction and of the co-efficient of elasticity of the metal forming the strut.

If this moment is called $M^1_c$, and if the weight of the platform $PL_i$ is assumed to be negligible compared with the pressure force $F_p$, the following equation is obtained which represents dynamic equilibrium for the platform in flight:

$$(M_c^1 + M_p)_{AXV_{i1}} = 0 \tag{2}$$

Figure 4B:
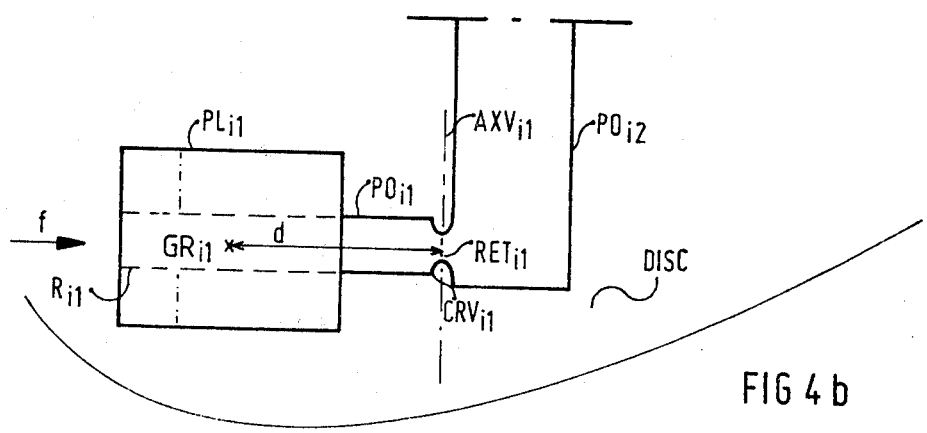
FIGS. 4b and 5b show the same platform, viewed from above, in flight above the disc.

$M_p$ is the moment of the pressure force $F_p$ about $AXV_{i1}$.

d shown in FIG. 4b represents the distance separating the virtual axis of rotation $AXV_{i1}$ from the center of gravity $GR_{i1}$ of the platform $PL_{i1}$. If $M^1_c$ is divided by the distance d, this gives the equivalent loading force $F^1_{ce}$ which balances the pressure force $F_p$. In other words, the effect of the bending moment $M^1_c$ of the constriction is equivalent to the effect of an equivalent loading force $F^1_{ce}$.

Figure 5A:
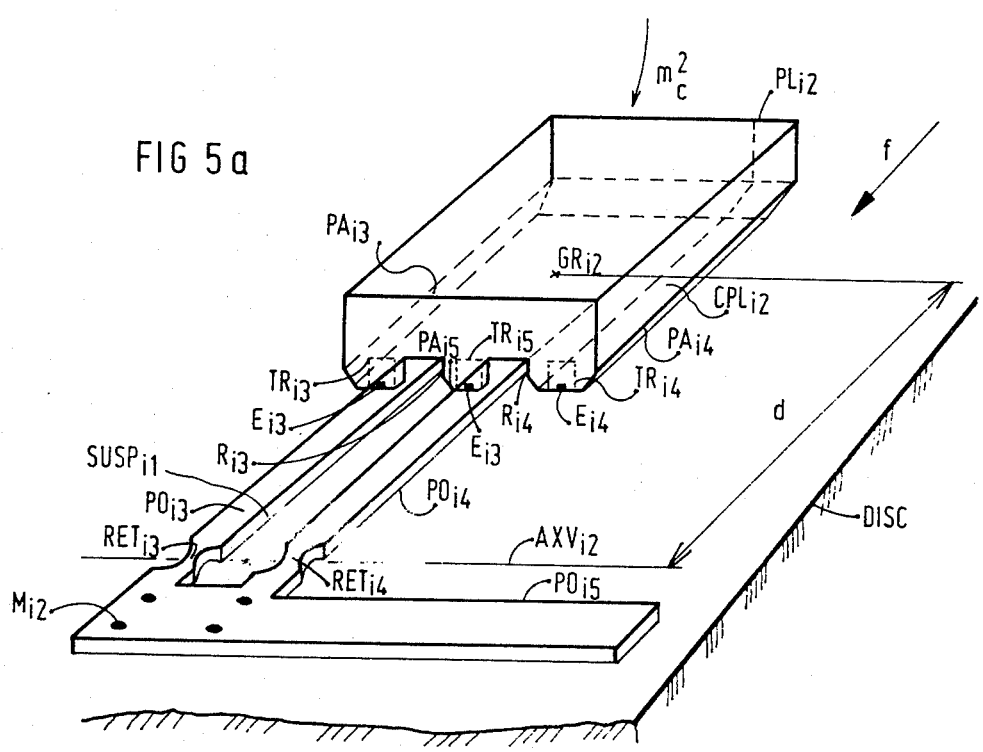
Figure 5B:
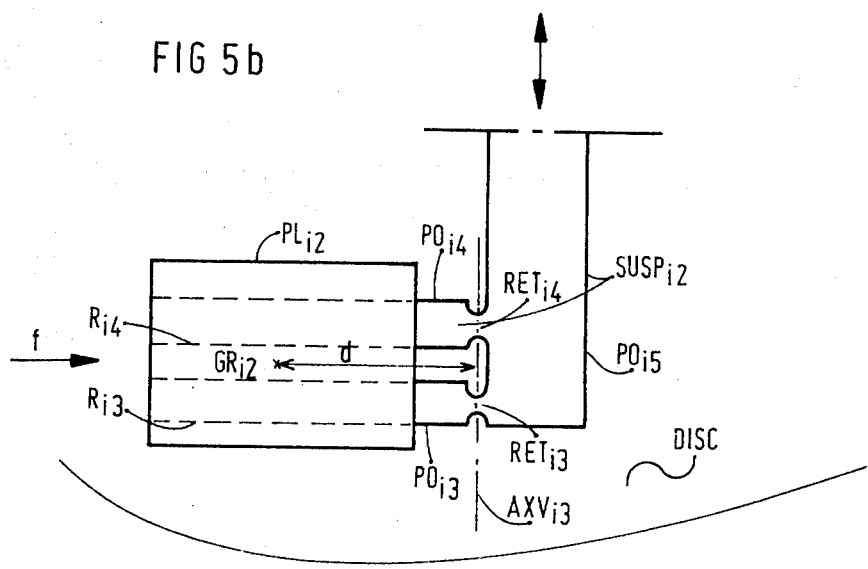

FIG. 5 shows a platform $PL_{i2}$ according to the invention whose main body $CPL_{i2}$ is of the trimaram type and has three skids $PA_{i3}$, $PA_{i4}$, $PA_{i5}$ between which are formed two grooves $R_{i3}$ and $R_{i4}$. The skids $PA_{i3}$ to $PA_{i5}$ each contain one of the transducers $TR_{i3}$ to $TR_{i5}$. The transducers $TR_{i3}$ to $TR_{i5}$ have respective air-gaps $E_{i3}$ to $E_{i5}$.

Advantageously, the device $SUSP_{i2}$ for suspending the platform $PL_{i2}$ according to the invention is fixed to the main body $PL_{i2}$ of the platform on the lower face of the body in the grooves $R_{i3}$ and $R_{i4}$, as described in the above-mentioned French patent application.

The suspension device $SUSP_{i2}$ includes two struts $PO_{i3}$ and $PO_{i4}$ each containing a constriction $RET_{i3}$ or $RET_{i4}$, the common axis of symmetry of the constrictions defining the virtual axis of rotation $ASV_{i2}$ of the platform $PL_{i2}$ according to the invention, which is thus given a physical form. Each of the struts $PO_{i3}$ and $PO_{i4}$ is rigid. The suspension device $SUSP_{i2}$ also includes a second rigid strut $PO_{i5}$ which is attached by attachment means $M_{i2}$ to the two struts $PO_{i3}$ and $PO_{i4}$.

In flight, since strut $PO_{i5}$ acts as a solid support, struts $PO_{i3}$ and $PO_{i4}$ will bend only at their points of minimum cross-section, that is to say, at the constrictions $RET_{i3}$ and $RET_{i4}$.

If we let $M_{c3}$ and $M_{c4}$ be the respective bending moments about axis $AXV_{i2}$ of the struts, these moments being of the same size and in the same direction, then if $Si\ M^2_c = M_{c3} + M_{c4} \simeq 2 \times M_{c1}$, dynamic equilibrium for the platform $PL_{i2}$ in flight will be defined by the equation:

$$(M_c^2 + M_p)_{AXV_{i1}} = 0 \tag{3}$$

If $M^2_c$ is divided by d, which is the distance between axis $AXV_{i2}$ and the center of gravity $GR_{i2}$ of the platform, this gives the equivalent loading force $F^2_{ce}$ which balances the pressure force $F_p$.

Figure 6:
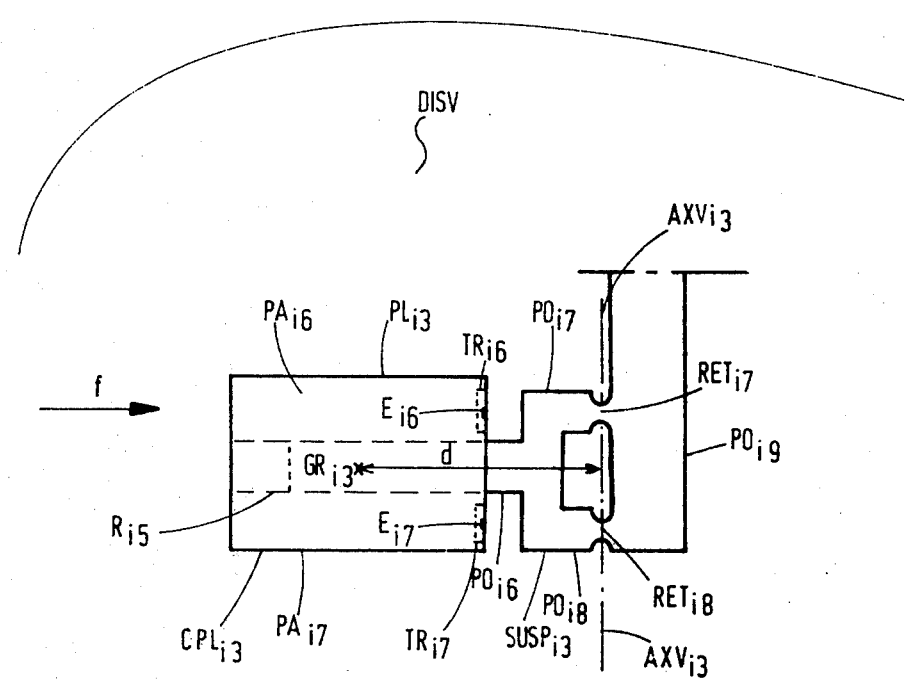

FIG. 6 is a view from above of a platform $PL_{i3}$ showing an alternative embodiment of the invention of the cataraman type which has a groove $R_{i5}$ situated between two skids $PA_{i6}$ and $PA_{i7}$ each containing a transducer $TR_{i6}$ or $TR_{17}$. Each of the transducers $TR_{i6}$ and $TR_{i7}$ has an air gap, namely, air gaps $E_{i6}$ and $E_{i7}$, respectively.

The device $SUSP_{i3}$ for suspending the platform includes a first strut $PO_{i6}$ which is fixed in the groove $R_{i5}$ on the lower face of the platform. This strut $PO_{i6}$ is divided into two rigid struts $PO_{i7}$ and $PO_{i8}$, each of which contains a constriction $RET_{i7}$ or $RET_{i8}$. The constrictions $RET_{i7}$ and $RET_{i8}$ define and give physical form to the axis of rotation $AXV_{i3}$ of the platform $PL_{i3}$.

If $M_{c7}$ and $M_{c8}$ represent the bending moments of constrictions $RET_{i7}$ and $RET_{i8}$, with $M^3_c = M_{c7} + M_{c8} \simeq 2\ M_{c7}$, then $$(M_c^3 + M_p)_{AXV_{i3}} = 0 \tag{4}$$

Then, if $M^3_c$ is divided by d, which is the distance between $AXV_{i3}$ and the center of gravity $GR_{i3}$ of the platform $PL_{i3}$, this gives the equivalent loading force $F^3_{CE}$ which enables the pressure force $F_p$ to be balanced.

It can be seen that in all the embodiments illustrated by FIGS. 4, 5 and 6, the virtual axis of rotation axis of rotation of the platforms according to the invention are given physical form by forming constrictions in the struts which make up the device for suspending the platform, the moment $M_p$ of the pressure forces $F_p$ about the virtual axis of rotation being balanced by the sum of the bending moments of these constrictions.

In all cases, an equivalent loading force can be defined which is obtained by dividing the sum of the bending moments of the constrictions by the distance d between the virtual axis of rotation or axis of oscillation and the center of gravity of the platform.

It is clear that without departing from the scope of the invention the device for suspending the platform according to the invention may, for example, be situated on the upper face of the platform.

It will be apparent that various modifications will suggest themselves to those skilled in the art. Accordingly, the foregoing description is not intended to limit the invention and resort should be made to the appended claims which define the true spirit and full scope of the invention.

What is claimed is:

1. A platform supporting at least one transducer for reading from and/or recording on a data carrier, wherein the data carrier moves relative to the platform and the platform during transducing is spaced from the data carrier by resulting air bearing pressure, comprising a main body having an upper and a lower face and containing the transducer, a suspension means including at least one rigid strut connected on one end to the said body and adapted to be connected at the other end to a carrier arm for positioning the transducer over the data carrier, said transducer having means for reading and/or recording data, said transducer being disposed in the lower face of said body facing the said carrier, and means for balancing the sum of the moments of the forces applied to the platform about the axis of oscillation of the platform such that said forces are zero, said means for balancing comprising a constriction in the strut at which the cross-sectional area of the strut is at a minimum, the constriction having an axis of symmetry in a direction perpendicular to the major dimension of the strut coinciding with the said axis of oscillation.

2. A platform according to claim 1, wherein the data carrier is a magnetic disc adapted to be rotated at high speed, and the sum of the bending moments about the constriction in the strut is zero.

3. A platform according to claim 2, wherein the said strut is connected to the lower face of the main body of the platform.

4. A platform according to claim 3, wherein the suspension means has two struts each having a constriction, the common axis of symmetry of said two constrictions being coaxial with the axis of oscillation.

5. A platform according to claim 4, wherein the sum of the bending moments about the two constrictions is zero.

6. A platform according to claim 1, wherein said lower face includes a plurality of skids, at least one groove disposed between said skids and said strut being fixed in said groove(s).

7. A platform adapted to be supported to a carrier arm for positioning the platform adjacent a data carrier wherein the data carrier moves relative to the platform and the platform during transducing is spaced from the data carrier by resulting air bearing pressure, comprising a main body having a lower face and an upper face, at least one transducer for reading and/or recording on the data carrier, said transducer being supported on the lower face of the main body and arranged to face the data carriers and suspension means for carrying said platform, said suspension means including at least one first rigid strut connected to said lower face of the main body, said suspension means including a constriction in said strut for balancing the sum of the moments of the forces applied to the platform about the axis of oscillation of the platform such that said forces are zero.

8. A platform according to claim 7, wherein the main body of said platform is of the cataraman type including two skids and a groove therebetween formed in the lower face, said suspension means comprising a first rigid strut including said constriction means and a second rigid strut, the first rigid strut having one end fixed in the said groove and the other end fixed to one end of the second rigid strut, the other end of the second rigid strut adapted to be fixed to the carrier arm.

9. A platform according to claim 6 or 8, wherein said first strut is disposed in a plane which passes through the center of gravity of the platform, and said constriction on the first strut is adjacent said other end at which point the cross-section area of said first strut is at a minimum.

10. A platform according to claim 7, wherein said platform is of the trimaran type including three skids and two grooves disposed between the grooves and formed in the lower face, said suspension means comprising identical first and second rigid struts each of which has a first end fixed in one of the two grooves and a second end both fixed to a third rigid strut, and a third rigid strut adapted to be secured to the carrier arm, each of said first and second struts having a constriction, the common axis of said constrictions being coaxial with the axis of oscillation of the platform.

11. A platform according to claim 10, wherein the first and second struts are situated in the same plane, the said plane passing through the center of gravity of the platform and wherein the sum of the bending moments about the two constrictions is zero.

* * * * *